United States Patent
Fatehi et al.

(10) Patent No.: US 10,725,783 B2
(45) Date of Patent: Jul. 28, 2020

(54) SPLITTING LOAD HIT STORE TABLE FOR OUT-OF-ORDER PROCESSOR

(71) Applicant: International Business Machines Corporation, Armonk, NY (US)

(72) Inventors: Ehsan Fatehi, Austin, TX (US); Richard J. Eickemeyer, Rochester, MN (US); Edmund J. Gieske, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 16/179,245

(22) Filed: Nov. 2, 2018

(65) Prior Publication Data

US 2020/0142702 A1    May 7, 2020

(51) Int. Cl.
*G06F 9/38* (2018.01)
*G06F 9/30* (2018.01)

(52) U.S. Cl.
CPC ........ *G06F 9/3838* (2013.01); *G06F 9/30043* (2013.01); *G06F 9/3824* (2013.01)

(58) Field of Classification Search
None
See application file for complete search history.

(56) References Cited

U.S. PATENT DOCUMENTS

| | | | |
|---|---|---|---|
| 6,311,261 B1 * | 10/2001 | Chamdani | G06F 9/3836 712/23 |
| 6,393,536 B1 | 5/2002 | Hughes et al. | |
| 7,461,239 B2 * | 12/2008 | Abernathy | G06F 9/30043 712/220 |
| 7,464,242 B2 | 12/2008 | Barrick et al. | |
| 8,285,947 B2 | 10/2012 | Beaumont-Smith et al. | |
| 8,521,992 B2 * | 8/2013 | Alexander | G06F 9/383 712/216 |
| 9,229,746 B2 | 1/2016 | Indukuru et al. | |
| 9,418,018 B2 * | 8/2016 | Sundaram | G06F 12/1045 |
| 9,747,217 B2 | 8/2017 | Ayub et al. | |

(Continued)

OTHER PUBLICATIONS

Hu et al.; "Avoiding Store Misses to Fully Modified Cache Blocks"; Date: Apr. 10-12, 2006; 8 Pages.

(Continued)

*Primary Examiner* — Cheng Yuan Tseng
(74) *Attorney, Agent, or Firm* — Cantor Colburn LLP; Bryan Bortnick

(57) ABSTRACT

According to one or more embodiments, an example computer-implemented method for executing one or more out-of-order instructions by a processing unit, includes decoding an instruction to be executed, and based on a determination that the instruction is a store instruction, identifying a split load-hit-store (LHS) table for the store instruction, wherein a LHS table of the processing unit includes multiple split LHS tables. Identifying the split LHS table includes determining, for the store instruction, a first split LHS table by performing a mod operation using one or more operands from the store instruction, and adding one or more parameters of the store instruction in the first split LHS table by generating an ITAG for the store instruction. The method further includes dispatching the store instruction for execution to an issue queue with the ITAG.

20 Claims, 12 Drawing Sheets

(56) References Cited

U.S. PATENT DOCUMENTS

| | | | |
|---|---|---|---|
| 9,959,123 B2 | 5/2018 | Bowman et al. | |
| 10,078,514 B2* | 9/2018 | Eickemeyer | G06F 12/0875 |
| 10,209,995 B2* | 2/2019 | Chadha | G06F 9/3834 |
| 10,394,558 B2* | 8/2019 | Gonzalez | G06F 9/3832 |
| 10,534,616 B2* | 1/2020 | Gonzalez | G06F 9/3855 |
| 10,572,256 B2* | 2/2020 | Lloyd | G06F 12/1027 |
| 2009/0055628 A1 | 2/2009 | Mitran et al. | |
| 2011/0154116 A1* | 6/2011 | Alexander | G06F 9/3834 |
| | | | 714/37 |
| 2013/0073833 A1 | 3/2013 | Konigsburg et al. | |
| 2016/0117174 A1 | 4/2016 | Chadha et al. | |
| 2016/0364242 A1 | 12/2016 | Alexander et al. | |
| 2017/0329607 A1* | 11/2017 | Eickemeyer | G06F 9/3802 |
| 2017/0351522 A1* | 12/2017 | Ayub | G06F 9/3838 |
| 2018/0039577 A1 | 2/2018 | Chadha et al. | |
| 2019/0108021 A1* | 4/2019 | Lloyd | G06F 12/1009 |
| 2019/0108032 A1* | 4/2019 | Gonzalez | G06F 9/3824 |

OTHER PUBLICATIONS

Katz et al. "A Novel Approach for Implementing Microarchitectural Verication Plans in Processor Designs"; Dated: Nov. 6-8, 2012, 15 pages.

Park et al.; "Reducing Design Complexity of the Load/Store Queue", Dated: Dec. 3-5, 2003; 12 pages.

Ravindar, Archana; "Strategies to Improve Application Performance on Powers", Dated: Nov. 14, 2016; 33 pages.

* cited by examiner

| ITAG | RA | RB | IMMED | THREAD | TYPE | VALID |
|------|------|------|-------|--------|------|-------|
| 0001 | 0001 | 0011 | FFE0h | 000 | 000 | 1 |
| 0002 | 0010 | 0100 | FFE0h | 000 | 000 | 0 |
| 0003 | 0010 | 0100 | FFFFh | 000 | 000 | 1 |
| | | | | | | |
| | | | | | | |
| | | | | | | |

| RA | RB | Displacement | ITAG | | | | | |
|----|----|--------------|------|--|--|--|--|--|
|    |    |              |      |  |  |  |  |  |
|    |    |              |      |  |  |  |  |  |
|    |    |              |      |  |  |  |  |  |
|    |    |              |      |  |  |  |  |  |
|    |    |              |      |  |  |  |  |  |

| Displacement | ITAG | | | | | | |
|--------------|------|--|--|--|--|--|--|
|              |      |  |  |  |  |  |  |
|              |      |  |  |  |  |  |  |

FIG. 8

| RA | RB | Displacement | ITAG | | | | | |
|----|----|----|----|---|---|---|---|---|

| ITAG | | | | | | | |
|------|--|--|--|--|--|--|--|

FIG. 11

SPLITTING LOAD HIT STORE TABLE FOR OUT-OF-ORDER PROCESSOR

BACKGROUND

Embodiments of the present invention relate to computing technology, in particular to processor architecture. In general, embodiments of the present invention are related to an out-of-order (OoO) processor and more specifically to a load hit store (LHS) table that is used to mitigate load hit store situations in a processor in which a younger load instruction executes before an older store instruction writes data to memory.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that contain dependency matrices for tracking dependencies between instructions. A dependency matrix typically includes one row and one column for each instruction in the issue queue.

In the domain of central processing unit (CPU) design, and particularly for OoO processors, hazards pose technical challenges with the instruction pipeline in the CPU microarchitectures when a next instruction cannot execute in the following clock cycle, because of potentially leading to incorrect computation results. Typical types of hazards include data hazards, structural hazards, and control flow hazards (branching hazards). Data hazards occur when instructions that exhibit data dependence modify data in different stages of a pipeline, for example, read after write (RAW), write after read (WAR), and write after write (WAW). A structural hazard occurs when a part of the processor's hardware is needed by two or more instructions at the same time, for example a memory unit being accessed both in the fetch stage where an instruction is retrieved from memory, and the memory stage where data is written and/or read from memory. Further, branching hazards (also termed control hazards) occur with branches in the computer program being executed by the processor.

SUMMARY

According to one or more embodiments, an example computer-implemented method for executing one or more out-of-order instructions by a processing unit, includes decoding an instruction to be executed, and based on a determination that the instruction is a store instruction, identifying a split load-hit-store (LHS) table for the store instruction, wherein a LHS table of the processing unit includes multiple split LHS tables. Identifying the split LHS table includes determining, for the store instruction, a first split LHS table by performing a mod operation using one or more operands from the store instruction, and adding one or more parameters of the store instruction in the first split LHS table by generating an ITAG for the store instruction. The method further includes dispatching the store instruction for execution to an issue queue with the ITAG.

According to one or more embodiments, a processing unit for executing one or more instructions includes a load hit store (LHS) table that includes multiple split LHS tables. The processing unit executes one or more instructions by performing a method that includes decoding an instruction to be executed, and based on a determination that the instruction is a store instruction, identifying a table for the store instruction. Identifying the split LHS table includes determining, for the store instruction, a first split LHS table by performing a mod operation using one or more operands from the store instruction, and adding one or more parameters of the store instruction in the first split LHS table by generating an ITAG for the store instruction. The method further includes dispatching the store instruction for execution to an issue queue with the ITAG.

A computer program product includes a computer readable storage medium having program instructions embodied therewith, the program instructions executable by a processing unit to cause the processing unit to perform a method that includes decoding an instruction to be executed, and based on a determination that the instruction is a store instruction, identifying a split load-hit-store (LHS) table for the store instruction, wherein a LHS table of the processing unit includes multiple split LHS tables. Identifying the split LHS table includes determining, for the store instruction, a first split LHS table by performing a mod operation using one or more operands from the store instruction, and adding one or more parameters of the store instruction in the first split LHS table by generating an ITAG for the store instruction. The method further includes dispatching the store instruction for execution to an issue queue with the ITAG.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 shows an exemplary single LHS table according to existing solutions;

FIG. 8 depicts an example LHS table according to one or more embodiments of the present invention;

FIG. 11 depicts an LHS extension table according to one or more embodiments of the present invention.

Figure 1:
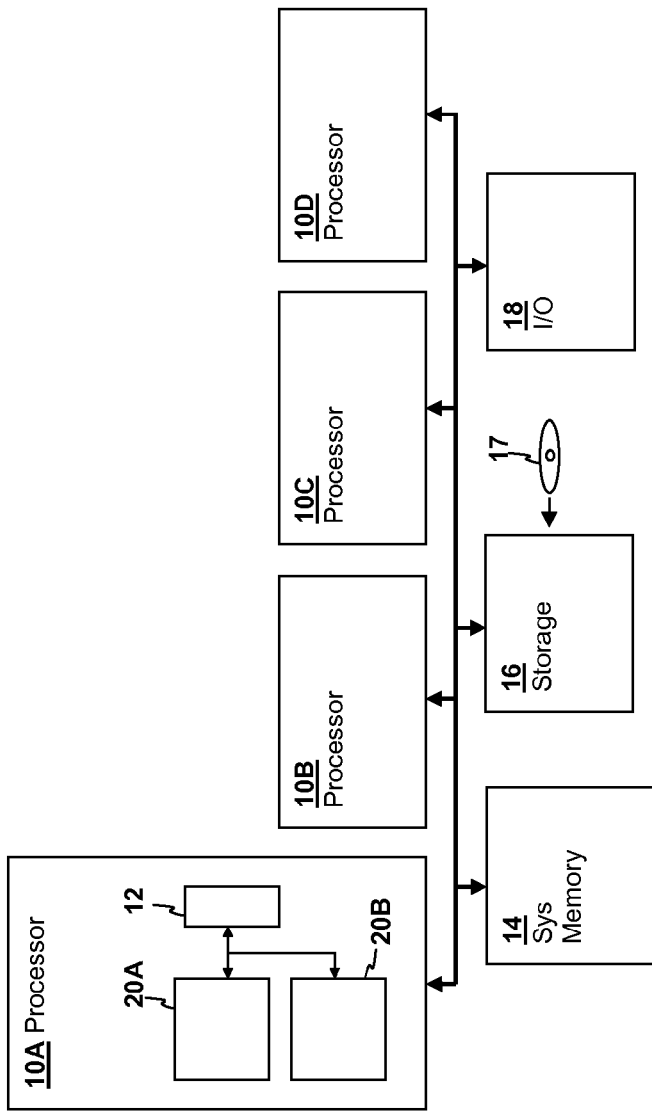
FIG. 1 depicts a block diagram of a processing system in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

In pipelined processors supporting out-of-order execution (OOE), overlaps between store and load instructions causing load-hit-store hazards represent a serious bottleneck in the data flow between a load store unit (LSU) and an instruction dispatch unit (IDU). In particular, in a typical pipelined processor, when a load-hit-store hazard is detected by the LSU, the load instruction that is dependent on the result of the store instruction is rejected, generally several times, and reissues the load instruction along with flushing all newer instructions following the load instruction. The above-described reject and reissue operation not only consumes resources of the load-store data path(s) within the processor, but can also consume issue queue space in the load-store execution path(s) by filling the load-store issue queue with rejected load instructions that must be reissued. When such an LHS hazard occurs in a program loop, the reject and reissue operation can lead to a dramatic reduction in system performance.

In some systems, the reissued load instruction entries are tagged with dependency flags, so that subsequent reissues will only occur after the store operation on which the load instruction depends, preventing recurrence of the reissue operations. However, rejection of the first issue of the load instruction and the consequent flushing of newer instructions still represents a significant performance penalty in OOE processors.

One or more embodiments of the present invention address such technical challenges and facilitate techniques for managing load-store operations in a processor with reduced rejection and reissue of operations, in particular load rejections due to load-hit-store hazards.

In one or more examples, the invention can be embodied in a processor core, a computer system, and a method that reduce rejection of load instructions by predicting/mitigating likely load-hit-store hazards. The method is a method of operation of the processor core and the computer system is a computer system including the processor core.

One or more embodiments of the present invention relate to processors and processing systems in which rejects of load instructions due to load-hit-store (LHS) hazards is reduced by predicting the occurrence of such hazards using an LHS prediction table to track dispatched stores that may or may not have been issued/executed. Load instructions are examined at dispatch time to determine whether or not a pending store exists that has not been committed for a cache write or that has otherwise been flushed from the load-store execution path. In some existing technical solutions, if an LHS hazard is detected, the load instruction is dispatched with an ITAG matching the ITAG of the store instruction corresponding to the entry in the LHS prediction table, so that the load-store unit will issue the load instruction dependent on the store result, i.e., will retain the load instruction in its issue queue until the store instruction is committed or flushed, preventing rejections of load instructions due to identification of LHS hazards during issue of the load instructions.

As mentioned above, due to the OoO nature of modern processors, younger load instructions may be chosen for execution ahead of older store instructions to a same real address (RA). When a younger load instruction executes ahead of an older store instruction to the same RA, the younger load instruction returns stale data and instructions in a processor pipeline must be flushed from the pipeline and re-fetched to restore program consistency. Typically, it is desirable to delay a younger load instruction until an older store instruction to a same RA executes so that other independent instructions can execute and not be unnecessarily flushed from a processor pipeline. A step in reducing processor pipeline flushes due to execution of a younger load instruction before an older store instruction to a same RA is to identify a load/store sequence that is to the same RA and will be executed OoO such that a processor pipeline flush is required. Alternatively, or in addition, the older load instruction from a load-reorder queue and all subsequent instruction therefrom are flushed from the load-reorder queue or from an instruction fetching unit (IFU). Flushing an instruction includes sending a flush message (that includes an appropriate identifier of the instruction) to the IFU.

Most modern computing devices provide support for virtual memory. Virtual memory is a technique by which application programs are given the impression that they have a contiguous working memory, or address space, when in fact the physical memory may be fragmented and may even overflow onto disk storage. Essentially, the application program is given a view of the memory of the computing device where the application accesses a seemingly contiguous memory using an effective address (EA), in the EA space visible to the application, which is then translated into a physical address of the actual physical memory or storage device(s) to actually perform the access operation. An EA is the value which is used to specify a memory location that is to be accessed by the operation from the perspective of the entity, e.g., application, process, thread, interrupt handler, kernel component, etc., issuing the operation.

That is, if a computing device does not support the concept of virtual memory, then the EA and the physical address are one and the same. However, if the computing device does support virtual memory, then the EA of the particular operation submitted by the application is translated by the computing device's memory mapping unit into a physical address which specifies the location in the physical memory or storage device(s) where the operation is to be performed.

Further, in modern computing devices, processors of the computing devices use processor instruction pipelines, comprising a series of data processing elements, to process instructions (operations) submitted by entities, e.g., applications, processes, etc. Instruction pipelining is a technique to increase instruction throughput by splitting the processing of computer instructions into a series of steps with storage at the end of each step. Instruction pipelining facilitates the computing device's control circuitry to issue instructions to the processor instruction pipeline at the processing rate of the slowest step which is much faster than the time needed to perform all steps at once. Processors with instruction pipelining, i.e. pipelined processors, are internally organized into stages which can semi-independently work on separate jobs. Each stage is organized and linked with the next stage in a series chain so that each stage's output is fed to another stage until the final stage of the pipeline.

Such pipelined processors may take the form of in-order or out-of-order pipelined processors. For in-order pipelined processors, instructions are executed in order such that if data is not available for the instruction to be processed at a particular stage of the pipeline, execution of instructions through the pipeline may be stalled until the data is available. OoO pipelined processors, on the other hand, allow the processor to avoid stalls that occur when the data needed to perform an operation are unavailable. The OoO processor instruction pipeline avoids these stalls by filling in "slots" in time with other instructions that are ready to be processed and then re-ordering the results at the end of the pipeline to make it appear that the instructions were processed in-order. The way the instructions are ordered in the original computer code is known as program order, whereas in the processor they are handled in data order, i.e. the order in which the data and operands become available in the processor's registers.

Modern processor instruction pipelines track an instruction's EA as the instruction flows through the instruction pipeline. It is important to track the instruction's EA because this EA is utilized whenever the processing of an instruction results in the taking of an exception, the instruction flushes to a prior state, the instruction branches to a new memory location relative to its current memory location, or the instruction completes its execution.

Tracking an instruction's EA is costly in terms of processor chip area, power consumption, and the like. This is because these EAs have large sizes (e.g., 64 bits) and modern processor instruction pipelines are deep, i.e. have many stages, causing the lifetime of an instruction from an instruction fetch stage of the processor instruction pipeline to a completion stage of the processor instruction pipeline to be very long. This cost may be further increased in highly multithreaded OoO processors, i.e. processors that execute instructions from multiple threads in an OoO manner, since a vast number of instructions from different address ranges can be processing, i.e. are "in flight," at the same time.

In one or more examples, computing devices use a combination of pipeline latches, a branch information queue (BIQ), and a global completion table (GCT) to track an instruction's EA. The base EA for a group of instructions is transferred from the front-end of the pipeline using latches until it can be deposited and tracked in the GCT of the instruction sequencer unit (ISU). The number of latches needed to store this data is on the order of the number of pipeline stages between a Fetch stage and a Dispatch stage of the pipeline. This is wasteful, as the EA is typically not needed during these stages. Rather it is simply payload data that is "along for the ride" with the instruction group as it flows through the pipeline. In addition, this method leads to duplicate storage as branch instructions have their EAs in both the BIQ and the GCT.

Accordingly, computing devices have been developed, that remove these inefficiencies by tracking the EA solely in the GCT. For example, these new computing devices, an instruction sequencer unit creates an entry in the GCT at fetch time. The EA is loaded into the GCT at this time and then removed when the instruction completes. This eliminates many pipeline latches throughout the machine. Instead of a full EA that is as long as number of address lines, for example a 64-bit EA, a small tag is carried along with the instruction group through the pipeline. This tag points back to the entry in the GCT, which holds the base EA for this instruction group. Address storage in the BIQ is no longer needed as branches can retrieve their EA directly from the GCT when they issue. Such techniques improve area efficiency, but they are not applicable in an OoO processor. Further, they lack sufficient information to process address requests arriving out of program order. In addition, these techniques cannot support dispatch and completion bandwidth required for OoO execution because they lack the ability to track instruction groups that may have been formed from multiple disjoint address ranges. Historically, such mechanisms have only supported instruction groups from a single address range, which can significantly reduce the number of instructions available to execute OoO. Further, to lookup corresponding addresses, such as an RA corresponding to an EA (or vice versa) a Content Addressable Memory (CAM) is used. A CAM implements a lookup-table function in a single clock cycle using dedicated comparison circuitry. The overall function of a CAM is to take a search word and return the matching memory location. However, such CAM takes chip area as well as consumes power for such lookups.

Further, such conversions of EA to corresponding RA are typically done at a second level of a memory nest associated with the processor. As used herein the term memory nest refers to the various types of storage that can be used by a processor to store data. In general, the memory nest includes a hierarchy of caches and physical memory. In general, as the level of the memory nest increases, the distance from the processor to the data increases and access latency for the processor to retrieve the data also increases. Thus, converting EA to RA slows the processor execution.

For example, a processor that is capable of issuing and executing instructions OoO may permit load instructions to be executed ahead of store instructions. Assuming that a real address (RA) of a younger load instruction does not overlap with an RA of an older store instruction, OoO execution of the younger load instruction and the older store instruction may provide performance advantages. In a typical program, the likelihood that an RA of a younger load instruction overlaps with an RA of an older store instruction (that executes after the younger load instruction) is relatively low. As is known, a store violation condition (store-hit-load (SHL)) is indicated when an RA of a store instruction hits in a load reorder queue (LRQ) of a load store unit (LSU). That is, when an RA of a newly issued older store instruction matches an RA of a younger load instruction present in the LRQ of the LSU, an SHL is indicated. However, as detection of an SHL typically occurs late in an instruction execution pipeline, recovering from an SHL typically results in a relatively severe penalty on processor performance. For example, recovery from an SHL typically involves invalidating the younger load instruction that caused the SHL and reissuing the younger load instruction, as well as all instructions issued after the older store instruction.

Further, for example, if two load instructions to the same address are executed OoO, and the value of the data at that address is changed between the executions of the two load instructions (e.g., by another processor), the later (i.e., younger) load will obtain an earlier (i.e., old) value, and the earlier (i.e., older) load will obtain a later (i.e., new) value. This situation is termed a "load-load order violation" or a "load-hit-load hazard." The requirement that if a younger load instruction obtains old data, an older load instruction to the same address must not obtain new data is termed "sequential load consistency." In addition, if a later (i.e., younger) load instruction is executed before an earlier (i.e., older) store instruction to the same address (i.e., memory location) is completed, the load instruction will obtain an earlier (i.e., old) value. This situation is termed a "load-store order violation" or a "load-hit-store hazard." (See, for example, "Power4 System Microarchitecture" by J. M. Tendler et al., IBM Journal of Research and Development, Volume 46, Number 1, January 2002, pp. 5-25.).

The illustrative one or more embodiments of the present invention described herein improve upon these techniques by splitting an LHS table, into two less expensive tables compared to the single LHS table used in existing solutions.

Alternatively, in one or more embodiments of the present invention the improvements are provided by using a dedicated LHS Table with compression, the LHS table being dedicated to a most used register. For example, an LHS table only stores instructions that are addressed to a register R1, and accordingly, only an ITAG can be stored in such an LHS table (eliminating additional fields that are used in existing LHS tables).

Alternatively yet, one or more embodiments of the present invention provide the improvements by using an extension of the LHS table, the extension being used for only storing ITAG of store instructions. For example, for store instructions that are evicted from the LHS table the ITAG is recorded into the extension in a first in first out (FIFO) manner. The extension table can subsequently be used with a store-hit-load (SHL) table to confirm that the ITAG entry in SHL table is actually a store instruction.

Turning now to FIG. 1, a processing system in accordance with an embodiment of the present invention is shown. The depicted processing system includes a number of processors 10A-10D, each in conformity with an embodiment of the present invention. The depicted multi-processing system is illustrative, and a processing system in accordance with other embodiments of the present invention includes uni-processor systems having symmetric multi-threading (SMT) cores. Processors 10A-10D are identical in structure and include cores 20A-20B and a local storage 12, which may be a cache level, or a level of internal system memory. Processors 10A-10B are coupled to a main system memory 14, a storage subsystem 16, which includes non-removable drives and optical drives, for reading media such as a CD-ROM 17. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
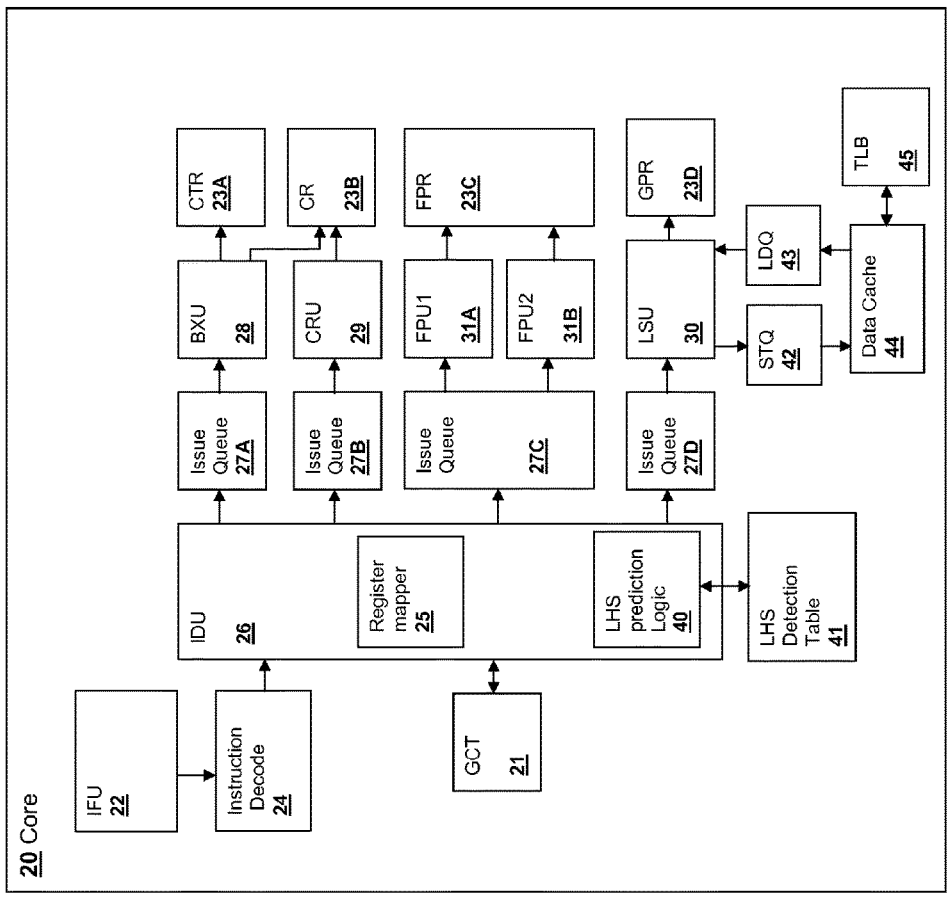
FIG. 2 is an exemplary block diagram of a processor architecture of OoO processor according to one or more embodiments of the present invention.

Referring now to FIG. 2, details of processor cores 20A-20B of FIG. 1 are illustrated in depicted processor core 20. Processor core 20 includes an instruction fetch unit (IFU) 22 that fetches one or more instruction streams from cache or system memory and presents the instruction stream(s) to an instruction decode unit 24. An instruction dispatch unit (IDU) 26 dispatches the decoded instructions to a number of internal processor pipelines. The processor pipelines each include one of issue queues 27A-27D and an execution unit provided by branch execution unit (BXU) 28, condition result unit (CRU) 29, load-store unit (LSU) 30 or floating point units (FPUs) 31A-31B. Registers such as a counter register (CTR) 23A, a condition register (CR) 23B, general-purpose registers (GPR) 23D, and floating-point result registers (FPR) 23C provide locations for results of operations performed by the corresponding execution unit(s). A global completion table (GCT) 21 provides an indication of pending operations that are marked as completed when the results of an instruction are transferred to the corresponding one of result registers 23A-23D. In embodiments of the present invention, a LHS prediction logic 40 within IDU 26 manages a LHS detection table 41 that contains entries for all pending store operations, e.g., all store operations that have not reached the point of irrevocable execution. IDU 26 also manages register mapping via a register mapper 25 that allocates storage in the various register sets so that concurrent execution of program code can be supported by the various pipelines. LSU 30 is coupled to a store queue (STQ) 42 and a load queue (LDQ) 43, in which pending store and load operations are respectively queued for storages within a data cache 44 that provides for loading and storing of data values in memory that are needed or modified by the pipelines in core 20. Data cache 44 is coupled to one or more translation look-aside buffers (TLB) 45 that map real or virtual addresses in data cache 44 to addresses in an external memory space.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device configured with flash memory to provide non-volatile memory for storing operating system files and/or user-generated data, for example. Essentially, data processing system 100 may be any known or later developed data processing system without architectural limitation.

As will be appreciated by one skilled in the art, one or more embodiments of the present invention may be embodied as a system, apparatus, or method. In one illustrative embodiment, the mechanisms are provided entirely in hardware, e.g., circuitry, hardware modules or units, etc. of a processor. However, in other illustrative embodiments, a combination of software and hardware may be utilized to provide or implement the features and mechanisms of the illustrative embodiments. The software may be provided, for example, in firmware, resident software, micro-code, or the like. The various flowcharts set forth hereafter provide an outline of operations that may be performed by this hardware and/or combination of hardware and software.

In illustrative embodiments in which the mechanisms of the illustrative embodiments are at least partially implemented in software, any combination of one or more computer usable or computer readable medium(s) that store this software may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a random access memory (RAM), a read-only memory (ROM), an erasable programmable read-only memory (EPROM or Flash memory), etc.

In one or more examples, the RA is calculated for a load (and/or a store) instruction using a combination of base, index, and displacement fields in the instruction. The operand address information is sent to the LSU 30.

The LSU 30 can access the data cache 44 and receives data from the data cache 44. The LSU 30 performs actual OSC detection, monitoring actual load and store accesses to the data cache 44. When the LSU 30 detects that an operand load has been requested for a location X in the data cache 44 that has not completed a store operation, the LSU 30 declares a reject condition for the associated instruction, because it cannot complete. The reject condition is forwarded to an execution unit and returned to an address generator (not shown).

Figure 3:
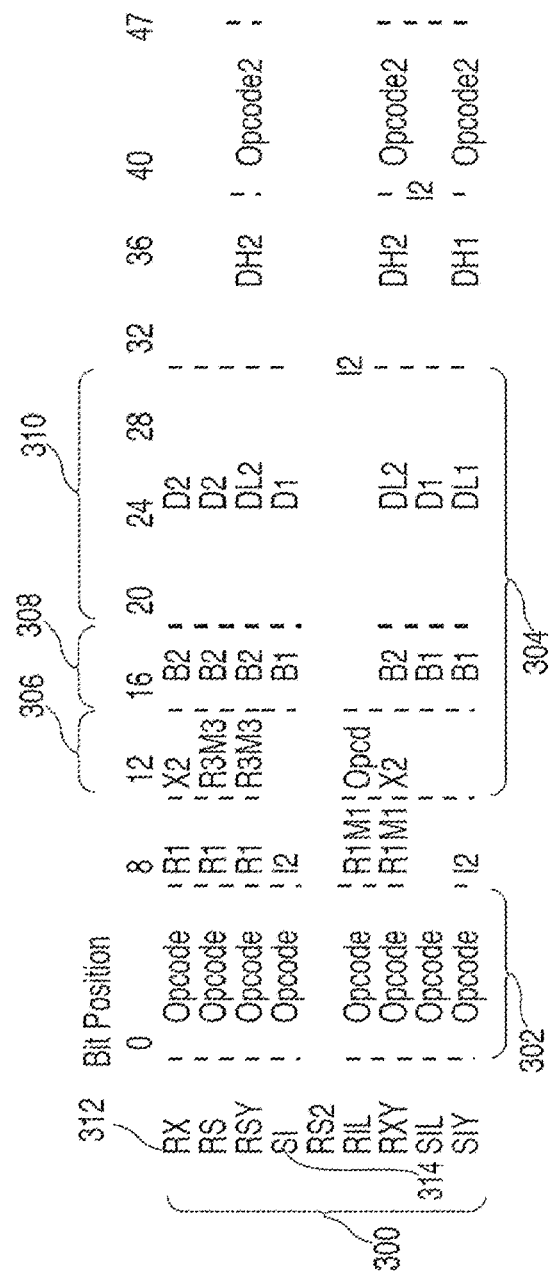
FIG. 3 depicts instruction format according to one or more embodiments of the present invention.

Turning now to FIG. 3, instruction formats 300 are depicted. Each row in the instruction formats 300 includes instruction text (itext) formatting for a particular instruction format in the instruction formats 300. Fields are defined relative to bit positions. For example, bits positions 0 to 7 represent opcodes 302. Bit positions 12 through 31 can contain operand address information 304 that may also include other information depending upon each instruction format. The operand address information 304 may include operands for the opcodes 302, such as an index field 306, a base field 308, and/or a displacement field 310. The index field 306, base field 308, and/or displacement field 310 can be combined to form a value used to detect a potential OSC. The index and base fields, 306 and 308, represent the number of a General Purpose Register (GPR) to be utilized in address generation. In cases where either field is not utilized by the instruction it is set to "0000". Each format in the instructions formats 300 may provide formatting for both load and store instructions. For example, the LHS detection logic 40 of FIG. 2 can identify load and store instructions formatted in RX format 312 and directly compare the operand address information 304 associated with each instruction, a subset of fields (e.g., base fields 308) or a combination of fields to detect a potential OSC. The identification and comparison of operand address information 304 for load and store instructions can also be performed across formats, such as a load instruction in RX format 312 and a store instruction in SI 314 format. The LHS prediction logic 40 may perform conditional comparisons that target specific instruction formats 300 and perform comparisons when the instruction formats 300 include specific fields, e.g., index fields 306.

Typically, existing solutions use a single LHS table 41 which is CAMed (very expensive as described herein) to avoid LHS occurring. Instead, according to one or more embodiments of the present invention the LHS table 41 is split into two or more tables, and which table to store a store is recorded is decided based on the instruction's parameters including the displacement and the registers being used (R1, R2, and displacement).

Figure 4:
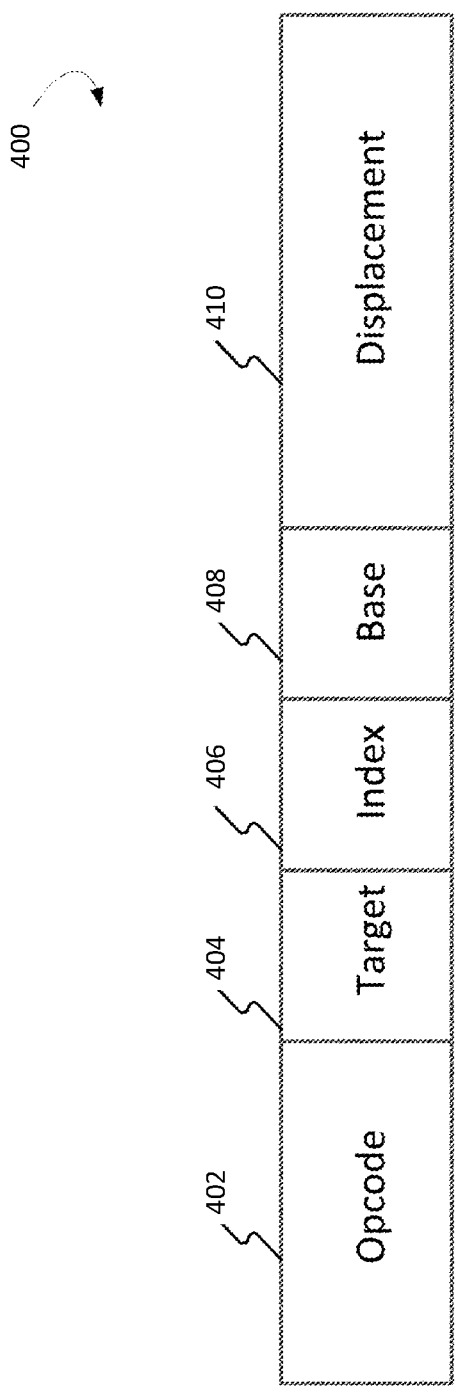
FIG. 4 depicts an instruction address in accordance with one or more embodiments of the present invention.

FIG. 4 depicts an instruction address 400, according to one or more embodiments. In some aspects, instruction address 400 includes an opcode 402, a base register 408 (R1), an index register 406, a displacement 410 and the target register 404 (R2).

FIG. 5 shows an exemplary single LHS table according to existing solutions. The depicted LHS table 41 is shown containing two valid entries and one entry that has been retired due to completion/commit of the store instruction to data cache 44 or invalidated due to a flush. In existing solutions, when IDU 26 receives a load instruction, LHS prediction logic 40 compares the address information (e.g., immediate field and/or base registers, depending on the type of addressing) of the load instruction with each entry in LHS detection table 41, which may be facilitated by implementing LHS detection table 41 with a content-addressable memory (CAM) that produces the ITAG of the LHS detection table entry given the address information, thread identifier and store instruction type for valid entries. In one or more examples, the LHS detection table 41 may alternatively be organized as a first-in-first-out (FIFO) queue. The load instruction is then dispatched to issue queue 27D with the ITAG of the entry, in order to cause LSU 30 to retain the load instruction in issue queue 27D until the store instruction causing the LHS hazard in conjunction with the load instruction has completed, or has been otherwise irrevocably committed or flushed. In one or more examples, the lookup in LHS detection table 41 locates the most recent entry matching the look-up information, so that if multiple matching entries exist in LHS detection table 41, the load instruction will be queued until the last store instruction causing an LHS hazard has been completed/committed/flushed. Alternatively, or in addition, before an entry is generated in LHS detection table 41, a look-up is performed to determine if a matching entry exists, and if so, the existing entry is invalidated or updated with a new ITAG. If LHS detection table 41 is full, the oldest entry is overwritten. It should be noted that the fields of the LHS 41 can vary among one or more embodiments of the present invention.

Figure 6:
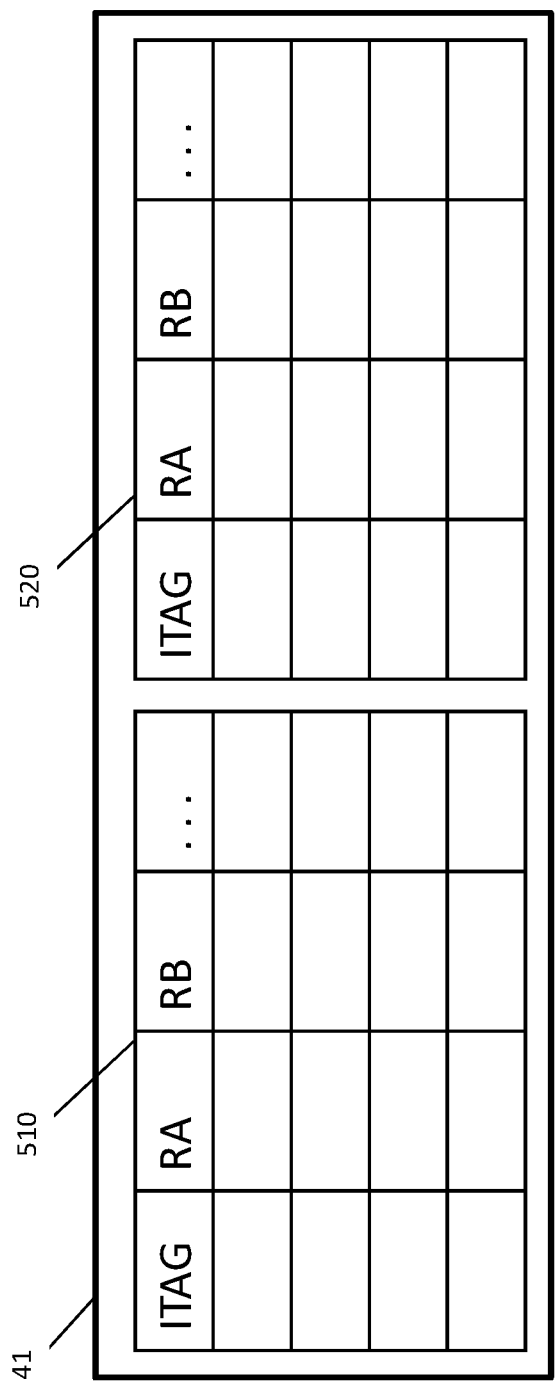
FIG. 6 depicts an example structure for an LHS according to one or more embodiments of the present invention.

FIG. 6 depicts an example structure for an LHS according to one or more embodiments of the present invention. Here, the LHS 41 is split into two LHS tables—LHS table-1 510 and LHS table-2 520. The split LHS tables 510 and 520 include half the number of entries each compared to the single LHS table 41. For example, if the single LHS table 41 included 24 entries, the split LHS tables 510 and 520 include 12 entries each. It should be noted that the number of LHS tables into which the single LHS table 41 is split can vary among one or more embodiments of the present invention; that is, the LHS table 41 can be split into three, four, or any other number of LHS tables in one or more examples. Each of the split LHS tables 510 and 520 include the same fields as the single LHS table 41.

Upon receiving a store instruction, the LHS prediction logic 40 can determine which of the split LHS tables 510 and 520 to place an entry corresponding to the store instruction.

Figure 7:
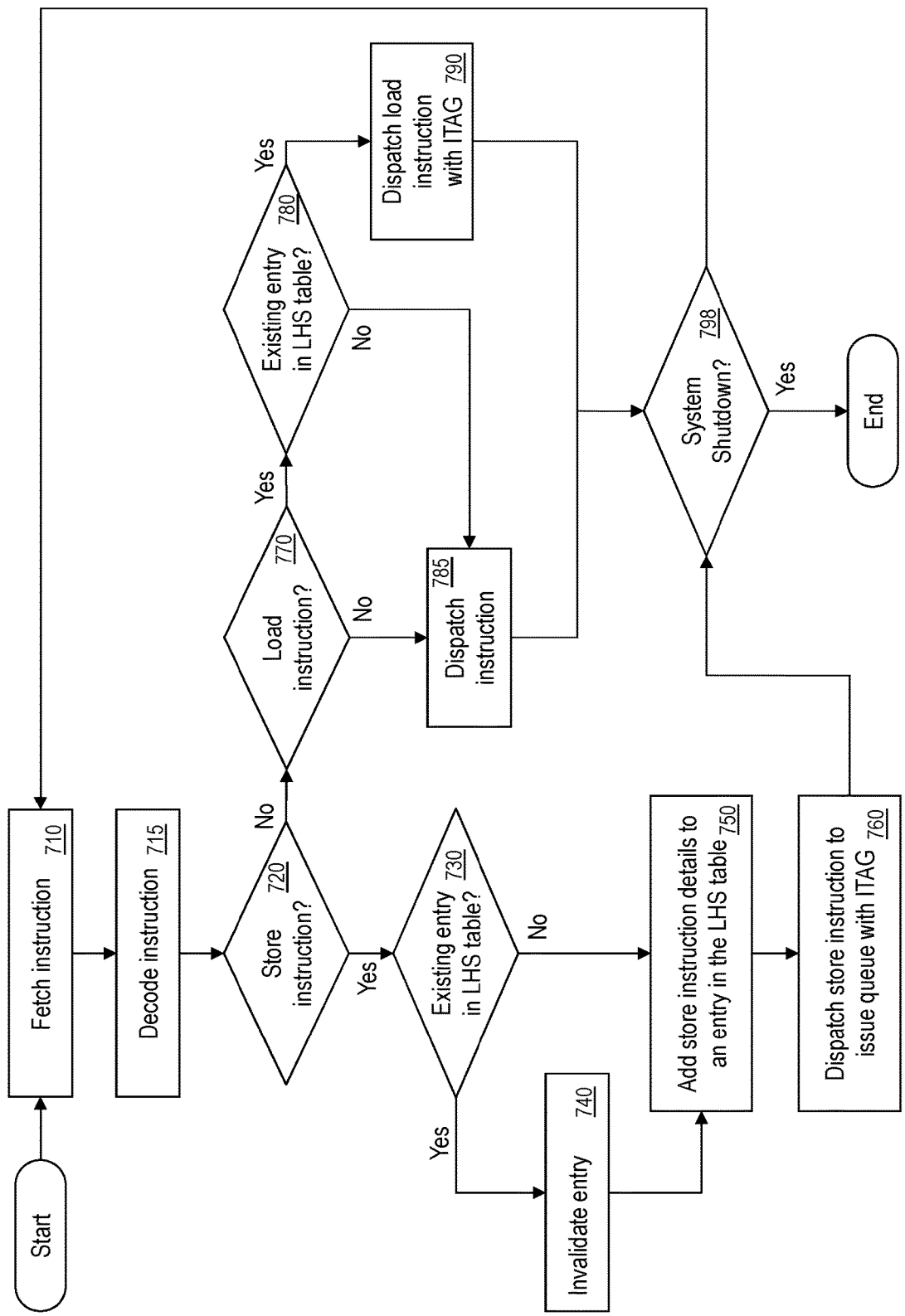
FIG. 7 illustrates a flowchart of an example method of operation of a processor core for deciding which LHS table to use to record a store instruction according to one or more embodiments of the present invention.

FIG. 7 illustrates a flowchart of an example method of operation of a processor core for deciding which LHS table to use to record a store instruction according to one or more embodiments of the present invention. As illustrated, when an IFU fetches an instruction (710) and the instruction is decoded (715), if the instruction is a store instruction (720), and if there is an existing entry in LHS table 41 that matches the base registers (register-based addressing) and/or immediate field (immediate addressing) of the store instruction (730), the existing entry is invalidated, or alternatively over-written (740). Further, in this case, the base registers and immediate field of the store instruction are written to a new entry in the LHS table 41 (750) and the store instruction is dispatched (760). In addition, a content-addressable memory (CAM) of the LHS detection table 41 produces the ITAG of the LHS detection table entry given the address information, thread identifier, and store instruction type for the entry.

Adding the store instruction in an entry in the LHS table 41 includes determining which split table 510, 520 to add the entry. In one or more examples, the determination is done based on the index register (RA), base register (RB), and displacement parameters in the store instruction. For example, a "mod (%)" operation can be used for the determination. The mod operation uses a number L into which the LHS table 41 is split, for example 2 tables %2, 3 tables %3 etc., and in general for L split tables % L.

In one or more examples, the split LHS table 510, 520 is decided by performing operations such as the following, which use the mod operation:

$(RA+RB+Disp\!\!>\!\!>\!\!4)\ \%\ L$ $(RA+RB+Disp\!\!>\!\!>\!\!3)\ \%\ L$ $(RA\!\!>\!\!>\!\!1+RB+Disp\!\!>\!\!>\!\!4)\ \%\ L$ $(RA\ \%\ L)$ $(RB+Disp\!\!>\!\!>\!\!4)\%\ L$ Various other combinations of the parameters and other logic/bit operations can be performed using the parameters to determine the split LHS table 510, 520. Accordingly, the mod operation is performed on a function of the operands of the instruction and the split LHS table 510, 520 for the instruction can be expressed as: Tsplit=f(RA, RB, Disp) % L, f being a bitwise, arithmetic, logic, or any other such operation or a combination thereof.

In the above calculations, depending on whether the store instruction is in X-form or D-form, the RB and Displacement parameters can be replaced with a predetermined value, such as 0. The D-Form instruction is used for any register-plus-address memory access form. The X-Form is used for indexed register indirect addressing, where the values of two registers are added together to determine the address for loading/storing.

Once the split table 510, 520 is decided, an entry for the store instructions is recorded by determining the ITAG of the instruction. Similar computation is performed when determining if an entry for the store instruction exists in the LHS table 41. First, the split table 510, 520 is determined and subsequently, an entry for the store instruction is searched.

Referring to the flowchart of FIG. 7, if the fetched instruction is not a store instruction (720), but is a load instruction (770), if the base registers (register-based addressing) or immediate field (immediate addressing) match an entry in LHS table 41 (780), the load instruction is dispatched to the issue queue 27D with an ITAG of the store instruction corresponding to the LHS table entry (790). Otherwise, the load instruction is dispatched without an ITAG (785), as are instructions that are neither load nor store instructions. Until the system is shut down (798), the method is repeated for all the instructions that are to be executed by the processor core.

Herein, the instructions are dispatched to the issue queue 27D with the ITAG of the entry in order to cause the LSU 30 to retain the load instruction in issue queue 27D until the store instruction causing the LHS hazard in conjunction with the load instruction has completed, or has been otherwise irrevocably committed or flushed. In case the LHS table 41 is full, the oldest entry is overwritten.

Because the entry is added to a split table that has fewer number of entries, searching for an existing entry for a store/load instruction is faster compared to a single LHS table. Accordingly, one or more embodiments of the present invention improve the efficiency of a processor core, and accordingly the computer system by splitting a load-hit-store table (to avoid load-hit store). Further, the splitting facilitates reducing an area and a power cost per entry of the load-hit-store table, wherein a memory disambiguation facility prevents out-of-order storage instruction execution that would otherwise cause excess flushing.

According to one or more embodiments of the present invention, the LHS table 41 includes a separate dedicated LHS table that is dedicated to instructions that use a particular register.

Figure 8:
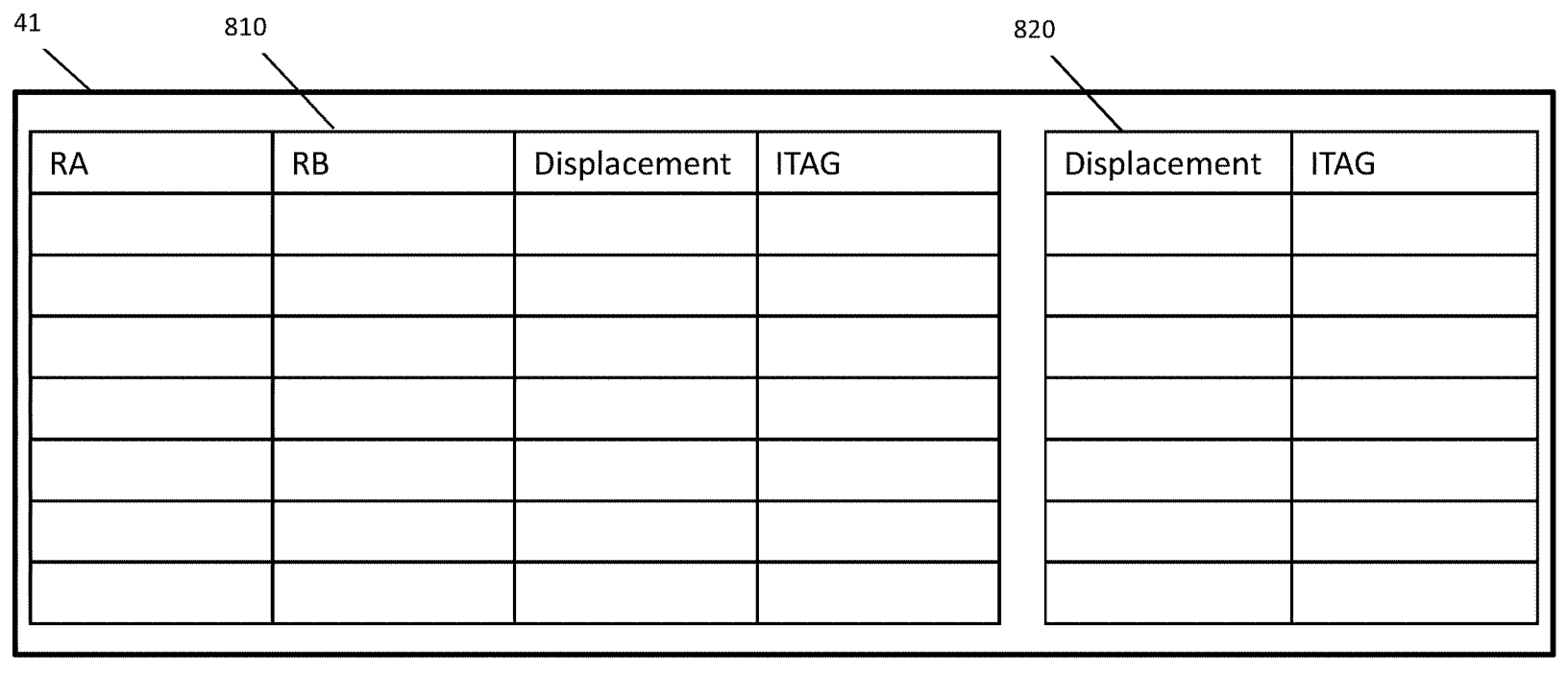

FIG. 8 depicts an example LHS table according to one or more embodiments of the present invention. Here, the LHS table 41 includes a first LHS table 810 and a dedicated LHS table 820. The first LHS table 810 includes the same fields as the LHS table 510 described herein, the fields including at least an ITAG, base register, index register, and displacement for a load/store instruction. The first LHS table 810 operates like a typical LHS table and is used to record store instructions that use registers other than the particular register, say R1. It is understood that in other examples, the dedicated register can be any other register in the processor core. Accordingly, a store instruction that does not use R1 as one of its operands has an entry added into the first LHS table 810.

Entries for store instructions that use the particular R1 register as one of its operands, and only for such store instructions, are stored in the dedicated LHS table 820. The dedicated register R1 is decided, for example, as a predetermined register. Alternatively, the dedicated register is determined dynamically based on a number of instructions using the register. In one or more examples, a software stack is checked for a register that is used by store instructions the most number of times, and that register is selected as the dedicated register. Entries for all store instructions using the selected dedicated register are then added into the dedicated LHS table 820, instead of the first LHS table 810, until the dedicated register is changed.

In one or more examples, only D-Form instructions are checked for selecting the dedicated register. Accordingly, the dedicated LHS table 820 includes fewer fields than those in the first LHS table 810, because the RA and RB do not have to be saved; rather the dedicated LHS table 820 can include only the ITAG and displacement fields. Entries are added in the dedicated LHS table 820 in the next available spot and once full, the oldest entry is replaced.

Figure 9:
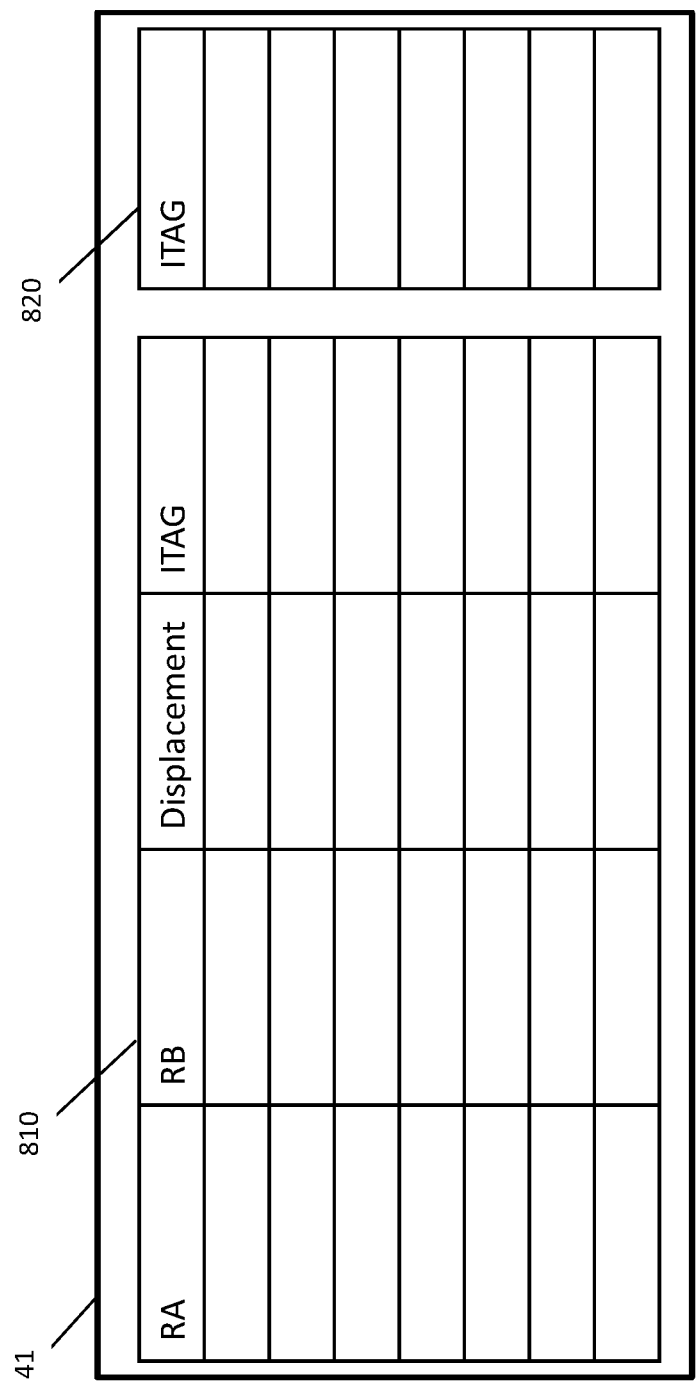
FIG. 9 depicts another example LHS table according to one or more embodiments of the present invention.

FIG. 9 depicts another example LHS table according to one or more embodiments of the present invention. Here, the dedicated LHS table 820 is further compressed and only includes the ITAG field. In this case, an entry for a store instruction is stored in such a compressed dedicated LHS table 820 by performing a mod operation using the displacement operand of the D-Form store instruction. For example, a position to add an entry for a store instruction can be determined as Position=(R1 Displacement>>x % size of dedicated LHS), where R1 is the dedicated register, x is a predetermined number, and size of the dedicated LHS table 820 is a predetermined number of entries in the dedicated LHS table 820.

Figure 10:
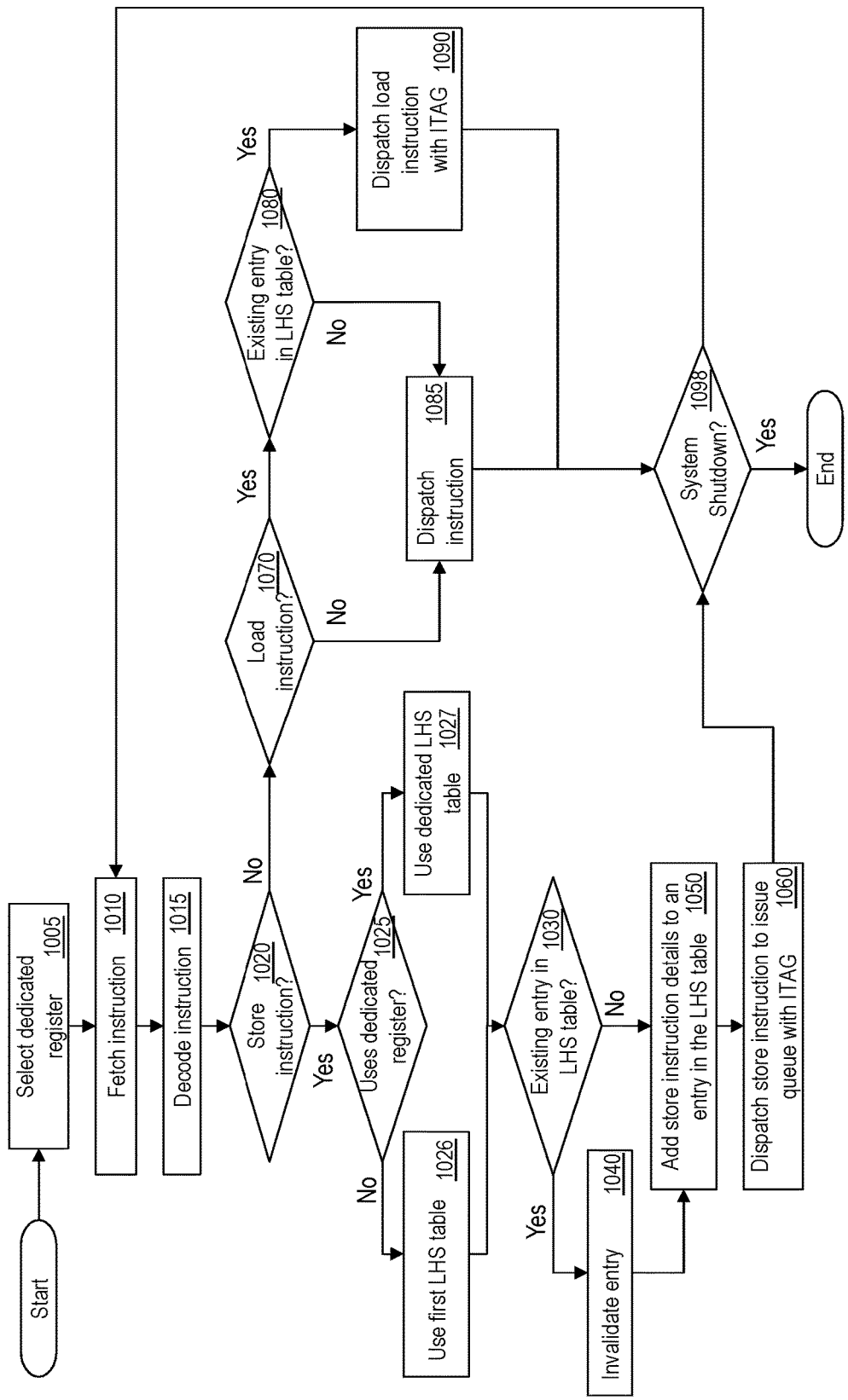
FIG. 10 illustrates a flowchart of an example method for operation of a processor core for using a dedicated LHS table to record a store instruction according to one or more embodiments of the present invention.

FIG. 10 illustrates a flowchart of an example method for operation of a processor core for using a dedicated LHS table to record a store instruction according to one or more embodiments of the present invention. As illustrated, a dedicated register is selected (1005) to be associated with the dedicated LHS table 820. The dedicated register can be selected by scanning a software stack (queued instructions in IFU) to determine which register has the highest number of occurrence in the queued instructions. In one or more examples, only D-Form instructions in the queued instructions are checked. Further, if the highest number of occurrence is greater than (or equal to) a predetermined threshold, the register with the highest number of occurrences is selected as the dedicated register.

Further, when an IFU fetches an instruction (1010) and the instruction is decoded (1015), it is checked if the instruction is a store instruction (1020), and if it uses the dedicated register as an operand (1025). In one or more examples, if the store instruction is a D-Form instruction that uses the dedicated register that is selected, the dedicated LHS table 820 is selected as the LHS table (1027) else the first LHS table 810 is selected as the LHS table (1026).

If there is an existing entry in LHS table 41 that matches the base registers (register-based addressing) and/or immediate field (immediate addressing) of the store instruction (1030), the existing entry is invalidated, or alternatively over-written (1040). Further, in this case, the base registers and immediate field of the store instruction are written to a new entry in the LHS table 41 (1050) and the store instruction is dispatched (1060). In addition, a content-addressable memory (CAM) of the LHS detection table 41 produces the ITAG of the LHS detection table entry given the address information, thread identifier, and store instruction type for the entry.

Here, recording the entry for the store instruction in the LHS table 41 includes recording the one or more parameters from the operand of the store instruction along with the ITAG in the selected LHS table (see 1026/1027). If the selected LHS table is the first LHS table 810, the operands of the store instruction are all recorded as in the typical LHS table. If the selected LHS table is the dedicated LHS table 820, only the ITAG and displacement are recorded (see FIG. 8). Alternatively, if the compressed dedicated LHS table is used (see FIG. 9), only the ITAG is recorded in an entry at a position calculated based on the displacement as described herein.

If the fetched instruction is not a store instruction (1020), but is a load instruction (1070), and if the base registers (register-based addressing) or immediate field (immediate addressing) match an entry in LHS table 41 (1080), the load instruction is dispatched to the issue queue 27D with an ITAG of the store instruction corresponding to the LHS table entry (1090). Otherwise, the load instruction is dispatched without an ITAG (1085), as are instructions that are neither load nor store instructions. Until the system is shut down (1098), the method is repeated for all the instructions that are to be executed by the processor core. Determining if the load instruction has a corresponding entry in the LHS table 41 includes determining if the load instruction uses the dedicated register that is selected and accordingly searching either the first LHS table 810 or the dedicated LHS table 820.

Accordingly, because the entries for the dedicated registers are in a separate LHS table, searching for an existing entry for a store/load instruction using the dedicated registers is faster compared to using a single LHS table. Accordingly, one or more embodiments of the present invention improve the efficiency of a processor core, and accordingly the computer system by splitting a load-hit-store table (to avoid load-hit store) according to the usage of a register. Further, the splitting facilitates reducing an area and a power cost per entry of the load-hit-store table, wherein a memory disambiguation facility prevents out-of-order storage instruction execution that would otherwise cause excess flushing.

According to one or more embodiments of the present invention, an extension table of the LHS table 41 is maintained for entries that are evicted from the LHS table 41, when the LHS table is operated in a FIFO manner. The extension table uses fewer resources compared to the LHS table 41, accordingly facilitating keeping at least a partial record of the evicted entries for a store-hit-load table to use as reference at a later time.

Figure 11:
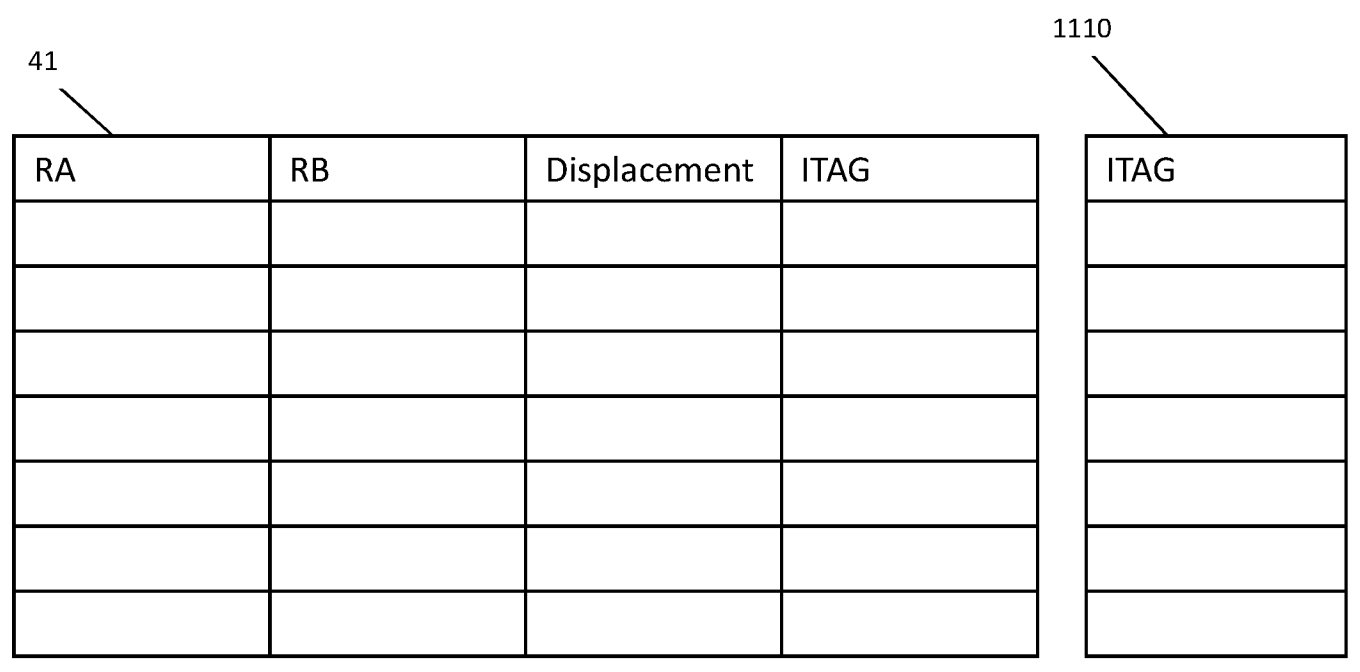

FIG. 11 depicts an LHS extension table according to one or more embodiments of the present invention. In the depicted LHS extension table 1110 includes only ITAG of entries, which are evicted from the LHS table 41. In other examples, the LHS extension table 1110 can include additional fields. The LHS entries are evicted for several reasons, including a newer entry being added to the LHS table 41 that is full causing an older entry to be removed. The LHS table 41 can be operated in FIFO mode with a limited number of entries, and accordingly and the oldest entry is evicted when a new entry is being added. In one or more examples, the LHS extension table 1110 includes the same number of entries as the LHS table 41. In other examples, the LHS extension table 1110 includes a different number of entries compared to the LHS table 41.

The entries stored in the LHS extension table 1110 are used by a store hit load (SHL) table to confirm that one or more store dependencies stored in the SHL table are indeed store instructions based on ITAG distance. In the case of an SHL collision, a younger load is issued before an older store (because the address generation has not yet occurred, so the dependency is unknown). The operand store compare (OSC) event is detected on the store, and because the load is past the point of reject, it must be flushed and dispatched again, wasting not just execution resources but pre-execution resources at the front of the pipeline as well. This is a more significant penalty than incurred on an LHS, since flush goes back further than dispatch. This can lead to the instruction to be re-fetched. The LHS extension table 1110 can mitigate such situations.

Figure 12:
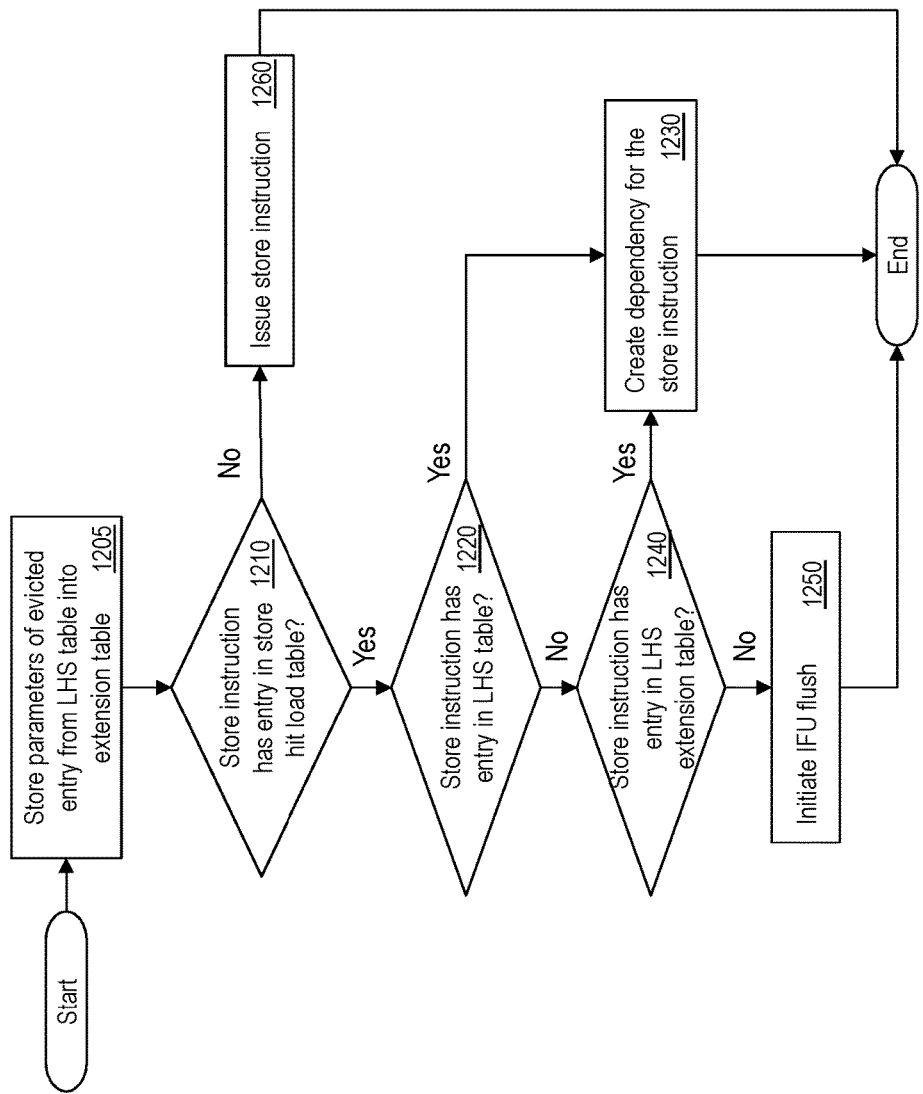
FIG. 12 illustrates a flowchart of an example method for operation of a processor core for using an LHS extension table to record evicted entries from an LHS table according to one or more embodiments of the present invention.

FIG. 12 illustrates a flowchart of an example method for operation of a processor core for using an LHS extension table to record evicted entries from an LHS table according to one or more embodiments of the present invention. As illustrated, the method includes storing one or more parameters of an evicted entry from the LHS table 41 into the LHS extension table 1110 (1205). In one or more examples, the parameters stored can include the ITAG from the evicted entry. The ITAG is stored in the next available entry in the LHS extension table 1110. The LHS extension table 1110 is a FIFO table, and once all the entries in the LHS extension table 1110 are filled, the oldest one is replaced.

Further, if a hit occurs on the SHL table (1210), the LSU checks if the store instruction that causes the hit in the SHL table has a corresponding entry in the LHS table 41 (1220). A hit on the SHL table occurs when a load instruction is looked up in the SHL table using a hash of an instruction address for the load instruction. For example, an index is created for the load instruction in the SHL table (using the instruction addresses bits). A tag is used to determine if a load instruction is the load instruction with the entry in the SHL table (the tag is created based on the instruction address as well). Once there is a match, the entry will have an ITAG distance. This distance is then carried over to the LHS table 41, where the ITAG is looked up by subtracting the load ITAG to the ITAG delta to find the store ITAG. Once this ITAG is looked up in the LHS table 41 it is determined if there is a hit in the LHS table 41, in which case a dependency is created between the store instruction corresponding to the hit in the LHS table 41 and the load instruction.

If the SHL table hit does not occur for a store instruction, the store instruction is issued for execution (1260). In the case of the SHL hit, if the entry is found in the LHS table 41, a dependency is created in the SHL table (1230). If the entry is not found in the LHS table 41, the LHS extension table 1110 is checked for the entry (1240). If the entry is found in the LHS extension table 1110, the dependency is created in the SHL table (1230). If the entry is not found in the LHS extension table 1110, the dependency is not created, and an IFU flush is initiated (1250). So in order to fully utilize the SHL table, recording as many store instructions as possible in the LHS is required.

It should be noted that in the processor, when the IDU decodes a store instruction with an indication of an SHL risk (SHL table hit), the IDU creates a dependency for the store instruction associated with the EA such that data consuming instructions having a matching EA are stalled (by an instruction issue unit (IIU) of the processor) until the store instruction executes. In another embodiment of the disclosure, where more than one register or constant is used to produce the EA, the IDU may create a dependency on one or more of the EA constituents to save area and/or timing. However, it should be appreciated that creating a dependency on one or more of the EA constituents prevents precisely identifying only instructions whose EA addresses match.

Because storing as many entries as possible in the LHS table 41 increases the effectiveness of the SHL table, maintaining the evicted entries from the LHS table 41 in the LHS extension table 1110, facilitates improved effectiveness of the SHL table. For example, the LHS extension table 1110 facilitates increasing performance of the processor with a reduced cost in terms of area/power that would be needed if the LHS table would just increase in size to facilitate an increased number of entries. Rather, as described herein, the LHS extension table 1110 uses fewer resources than a longer LHS table by just having an ITAG entry, where the SHL table can use the LHS extension table 1110 to confirm the encountered instruction is actually a store, and subsequently honor the SHL table hit.

Accordingly, one or more embodiments of the present invention address technical challenges in computing technology, particularly processor architecture and instruction execution, specifically in processors that facilitate out of order instruction processing. Typically, an LHS table is used to prevent hazards, however, the LHS table is expensive in terms of power and area as the LHS table is fully associative in existing techniques. Hence, there is a need for a larger LHS table, to prevent store hit loads (SHLs). However, this cannot be done practically due to power and area constraints. One or more embodiments of the present invention address such technical challenges by facilitating extending the LHS table with fewer resources than replicating the LHS table, and accordingly, improving the computing performance of the processor with fewer computing resources.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for executing one or more out-of-order instructions by a processing unit, the method comprising:
   decoding an instruction to be executed;
   based on a determination that the instruction is a store instruction, identifying a split load-hit-store (LHS) table for the store instruction, an LHS table of the processing unit comprising a plurality of split LHS tables, the identifying comprising:
      determining, for the store instruction, a first split LHS table from the plurality of split LHS tables by performing a mod operation using one or more operands from the store instruction;
      adding one or more parameters of the store instruction in the first split LHS table by generating an ITAG for the store instruction; and dispatching the store instruction for execution to an issue queue with the ITAG.

2. The computer-implemented method of claim 1, wherein the operands of the store instruction include an index register (RA).

3. The computer-implemented method of claim 1, wherein the operands of the store instruction used for determining the first split LHS table include a base register (RB).

4. The computer-implemented method of claim 1, wherein the operands of the store instruction used for determining the first split LHS table include a displacement.

5. The computer-implemented method of claim 1, wherein the mod operation is performed on a result of a function of an index register, a base register, and a displacement of the store instruction.

6. The computer-implemented method of claim 1, further comprising:
prior to adding the one or more operands of the store instruction in an entry in the first split LHS table, checking for an existing entry corresponding to the store instruction in the first split LHS table; and
based on identifying the existing entry, invalidating the existing entry prior to adding the entry.

7. The computer-implemented method of claim 1, further comprising:
based on a determination that the instruction is a load instruction, checking for an existing entry corresponding to the load instruction in the LHS table, the checking comprising:
identifying the split LHS table corresponding to the load instruction, from the plurality of split LHS tables, using the mod operation with one or more operands of the load instruction.

8. A processing unit for executing one or more instructions, the processing unit comprising:
a load hit store (LHS) table comprising a plurality of split LHS tables; and
the processing unit configured to execute instructions by performing a method that comprises:
decoding an instruction to be executed;
based on a determination that the instruction is a store instruction, identifying a split load-hit-store (LHS) table for the store instruction, the identifying comprising:
determining, for the store instruction, a first split LHS table from the plurality of split LHS tables by performing a mod operation using one or more operands from the store instruction;
adding one or more parameters of the store instruction in the first split LHS table by generating an ITAG for the store instruction; and
dispatching the store instruction for execution to an issue queue with the ITAG.

9. The processing unit of claim 8, wherein the operands of the store instruction include an index register (RA).

10. The processing unit of claim 8, wherein the operands of the store instruction used for determining the first split LHS table include a base register (RB).

11. The processing unit of claim 8, wherein the operands of the store instruction used for determining the first split LHS table include a displacement.

12. The processing unit of claim 8, wherein the mod operation is performed on a result of a function of an index register, a base register, and a displacement of the store instruction.

13. The processing unit of claim 8, further comprising:
prior to adding the one or more operands of the store instruction in an entry in the first split LHS table, checking for an existing entry corresponding to the store instruction in the first split LHS table; and
based on identifying the existing entry, invalidating the existing entry prior to adding the entry.

14. The processing unit of claim 8, further comprising:
based on a determination that the instruction is a load instruction, checking for an existing entry corresponding to the load instruction in the LHS table, the checking comprising:
identifying the split LHS table corresponding to the load instruction, from the plurality of split LHS tables, using the mod operation with one or more operands of the load instruction.

15. A computer program product comprising a computer readable storage medium having program instructions embodied therewith, the program instructions executable by a processing unit to cause the processing unit to perform operations comprising:
decoding an instruction to be executed;
based on a determination that the instruction is a store instruction, identifying a split load-hit-store (LHS) table for the store instruction, an LHS table of the processing unit comprising a plurality of split LHS tables, the identifying comprising:
determining, for the store instruction, a first split LHS table from the plurality of split LHS tables by performing a mod operation using one or more operands from the store instruction;
adding one or more parameters of the store instruction in the first split LHS table by generating an ITAG for the store instruction; and
dispatching the store instruction for execution to an issue queue with the ITAG.

16. The computer program product of claim 15, wherein the operands of the store instruction comprise an index register (RA), a base register (RB), and a displacement.

17. The computer program product of claim 15, wherein the mod operation is performed on a result of a function of an index register, a base register, and a displacement of the store instruction.

18. The computer program product of claim 15, further comprising:
prior to adding the one or more operands of the store instruction in an entry in the first split LHS table, checking for an existing entry corresponding to the store instruction in the first split LHS table; and
based on identifying the existing entry, invalidating the existing entry prior to adding the entry.

19. The computer program product of claim 15, further comprising:
based on a determination that the instruction is a load instruction, checking for an existing entry corresponding to the load instruction in the LHS table, the checking comprising:
identifying the split LHS table corresponding to the load instruction, from the plurality of split LHS tables, using the mod operation with one or more operands of the load instruction.

20. The computer program product of claim 19, further comprising:
based on identifying the existing entry for the load instruction, dispatching the load instruction with the ITAG from the existing entry.

* * * * *